W. E. GLEESON.
TOY VEHICLE.
APPLICATION FILED SEPT. 23, 1919.
1,350,492.
Patented Aug. 24, 1920.
2 SHEETS—SHEET 1.
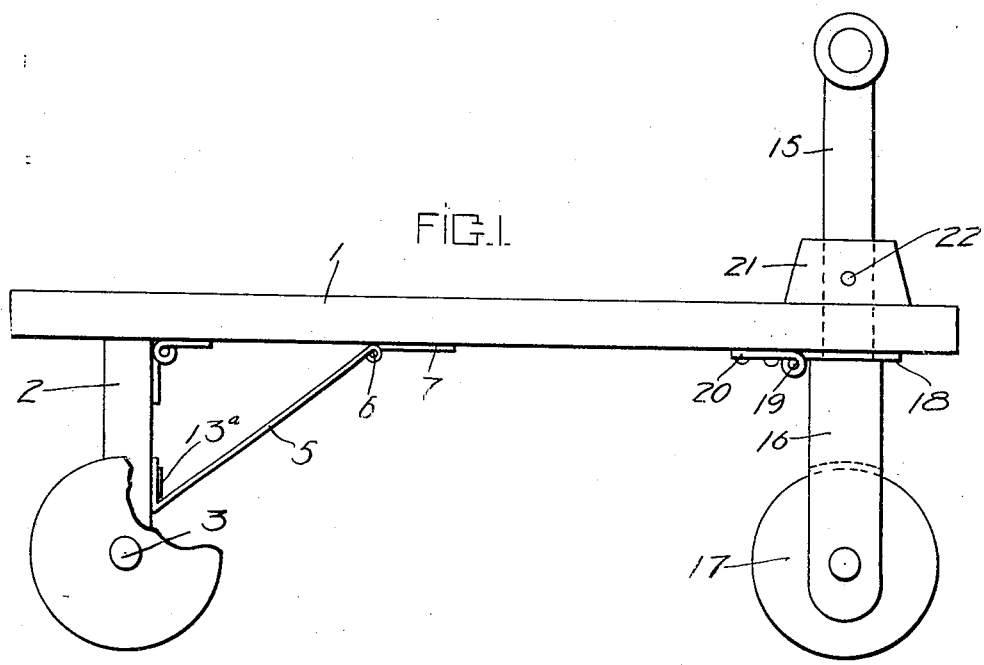
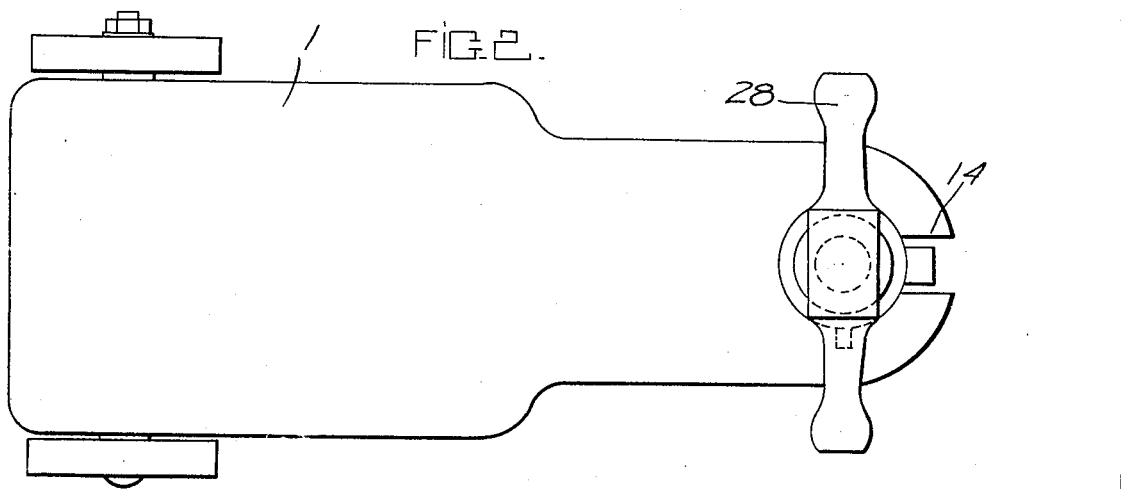
WITNESS:
H. B. Kirkman
W. E. Gleeson,
INVENTOR.
BY
Victor J. Evans
ATTORNEY.

W. E. GLEESON.
TOY VEHICLE.
APPLICATION FILED SEPT. 23, 1919.
1,350,492.
Patented Aug. 24, 1920.
2 SHEETS—SHEET 2.
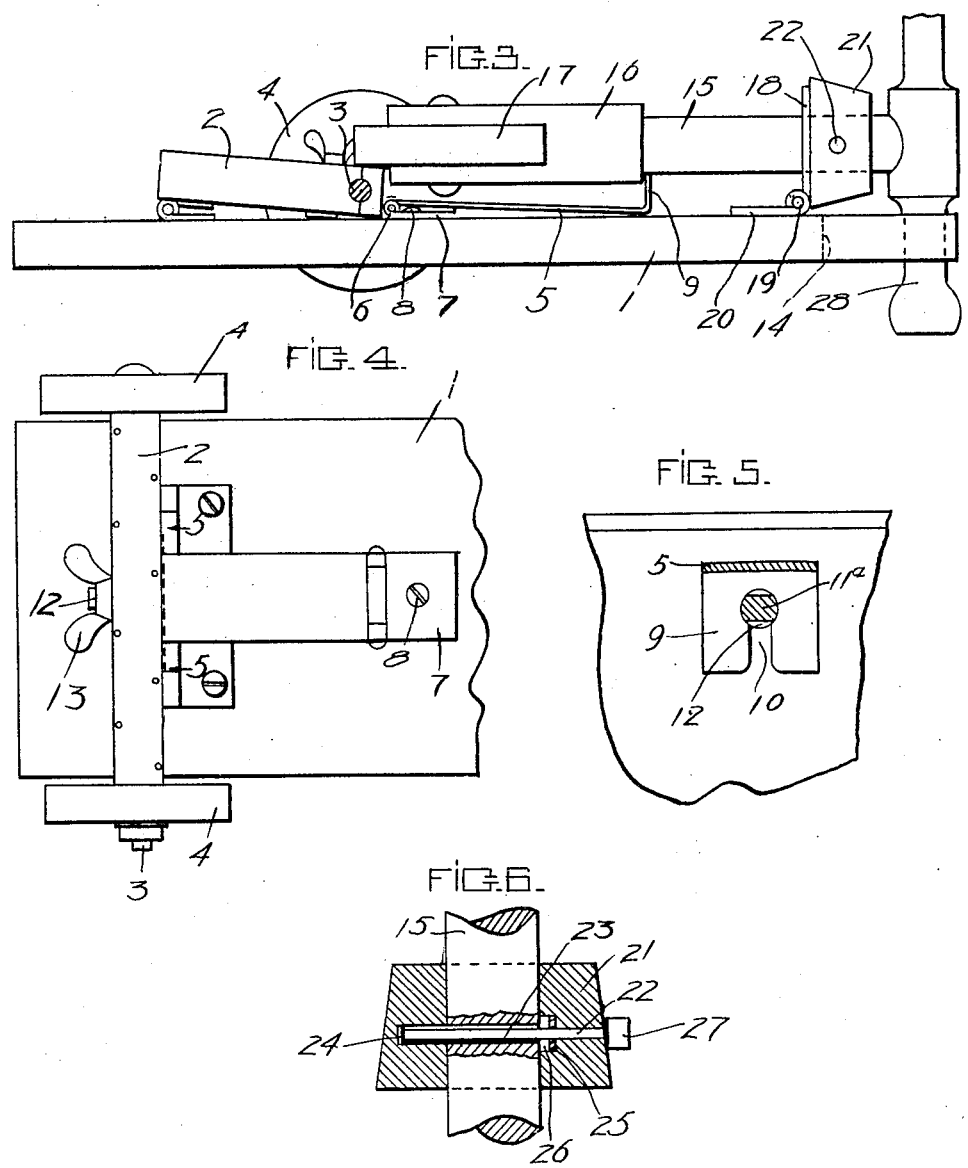
WITNESS:
J. B. Kirkman
W. E. Gleeson
INVENTOR.
BY
Victor J. Evans
ATTORNEY.

UNITED STATES PATENT OFFICE.

WILLIAM E. GLEESON, OF EAST McKEESPORT, PENNSYLVANIA.

TOY VEHICLE.

1,350,492.  Specification of Letters Patent.  Patented Aug. 24, 1920.

Application filed September 23, 1919. Serial No. 325,757.

*To all whom it may concern:*

Be it known that I, WILLIAM E. GLEESON, a citizen of the United States, residing at East McKeesport, in the county of Allegheny and State of Pennsylvania, have invented new and useful Improvements in Toy Vehicles, of which the following is a specification.

This invention relates to toy vehicles, and more particularly to a vehicle which is adapted to be operated or propelled by a child.

One of the main objects of the invention is to provide a vehicle of this type of simple construction which may be readily folded so as to occupy a minimum of space for transporting. A further object is to provide a vehicle which may be readily set up, and is effectually braced, for use. Further objects will appear from the detailed description.

In the drawings:—

Figure 1 is a side view of a vehicle constructed in accordance with my invention as set up.

Fig. 2 is a top plan view of the same.

Fig. 3 is a side view of the vehicle folded.

Fig. 4 is a fragmentary underneath plan view.

Fig. 5 is a section taken substantially on line 5—5 of Fig. 4.

Fig. 6 is a sectional detail of the means for securing the collar to the spindle.

The vehicle is provided with a seat board 1 of suitable shape to the underside of which is hingedly secured a rear pillow block 2 carrying an axle 3 secured therein in any suitable manner, rear ground wheels 4 being mounted at the ends of the axle. A brace 5 is hingedly secured at its inner end, at 6, to a hinge plate 7 which is secured by a screw 8 to the under face of board 1 so as to be readily turned about the screw. This brace is provided at its other end with an angularly disposed finger 9 having a key hole slot 10 adapted to receive the flattened portion 11ª of a securing bolt 12 inserted through pillow block 2 above the axle, a wing nut 13 being screwed on the outer end portion of this bolt. As will be readily understood, the bolt is provided on its inner end with an enlarged head 13ª so that, by moving the brace 5 into such position as to cause the bolt to enter the lower enlarged portion of slot 10 and then tightening the wing nut upon the bolt, the brace is readily secured tightly in operative position, the flattened portion 11ª of the bolt being turned at right angles to the restricted portion of slot 10 as in Fig. 5. This effectually prevents all possibility of accidental release of the brace, and this brace acts to hold the pillow board 2 rigidly in operative position.

The seat board 1 is provided at its forward end with a longitudinally extending slot 14 through which extends a steering spindle 15 the lower end portion of which is enlarged and slotted to provide a fork 16 in which is mounted the front ground and steering wheel 17. The spindle 15 extends through a relatively thick holding collar 18 which is hinged at 19 to a plate 20 fixedly secured to the under side of board 1. A stop collar 21 fits about spindle 15 and is adapted to be secured thereto by means of a pin 22 slidable through alined bores in the collar, and through a bore 23 extending diametrically of spindle 15. This pin is provided at its inner end with an enlargement or bead 24 and is slidable through a limiting collar 25 secured in a recess 26 provided in the inner portion of collar 21. For convenience in manipulation the pin is provided with an enlarged head or knob 27 at its outer end. The bead 24 and limiting collar 25 serve to effectually prevent complete withdrawal of the pin, while permitting the collar to be readily secured to or released from the spindle 15. The collar 18 and the stop collar 21 coöperate to effectually hold the spindle 15 and fork 16 in vertical position while permitting free turning of the spindle in either direction for steering purposes, a gripping member or handle 28 being secured upon the upper end of the spindle for this purpose. When the vehicle is set up as in Fig. 1, all of the parts thereof are effectually braced and held in proper relation so as to permit the vehicle to be propelled and steered in the known manner. When the vehicle is not in use, by withdrawing the pin 22 and sliding the collar 21 upwardly on spindle 15, the brace 5 being released from pillow block 2, the spindle and parts associated therewith may be readily turned into substantial parallelism with the under face of seat board 1 so as to be positioned closely adjacent thereto, and the pillow block 2 may be folded upwardly and inwardly into parallelism with and closely adjacent the under face of the seat board as illustrated in Fig. 3. To permit this folding of the spindle and the parts associated therewith and the pillow block, the brace member 5 is turned upwardly into parallelism with the seat board and the hinge plate 7 may be turned slightly about screw 8 so that the finger 9 of the brace member is positioned slightly to one side of the fork 16 so as not to interfere therewith. When the spindle has been folded as in Fig. 3, the handle 28 fits snugly through the slot 14 so as to hold the front wheel 17 in parallelism with the board, the front wheel being positioned closely adjacent and above the pillow block 2 and brace 5 being turned so that by slightly springing finger 9 thereof the finger engages the shoulder of fork 16. This effectually prevents all looseness or play of parts and, if desired, the vehicle may be readily carried by handle 28. When thus folded the vehicle occupies a minimum of space and may be readily packed for transporting. As will be appreciated, in practice it may be found desirable to resort to slight changes in details of construction and arrangement of the parts of the invention and I intend to include all such variations, as fall within the scope of the appended claims, in this application in which the preferred form only of my invention is disclosed.

What I claim is:

1. In a toy vehicle, a seat board, a pillow block hingedly secured to said board so as to be movable toward and away from the same, bracing means for securing the pillow block in a substantially vertical position, said board being provided with a slot extending from the forward end thereof, a holding collar hingedly secured to the board adjacent said slot, a steering spindle fitting through said collar so as to be rotatable therein and provided at its lower end with a fork, a steering ground wheel mounted in said fork, and a stop collar releasably secured to said spindle and normally engaging the upper face of the board so as to hold the spindle in vertical position while permitting turning thereof for steering purposes.

2. In a toy vehicle, a seat board, a pillow block hingedly secured to said board so as to be movable toward and away from the same, bracing means for securing the pillow block in a substantially vertical position, said board being provided with a slot extending from the forward end thereof, a holding collar hingedly secured to the board adjacent said slot, a steering spindle fitting through said collar so as to be rotatable therein and provided at its lower end with a fork, a steering ground wheel mounted in said fork, a stop collar releasably secured to said spindle for normally engaging the upper face of the board so as to hold the spindle in vertical position while permitting turning thereof for steering purposes, and a handle secured on said spindle at right angles to the wheel, the spindle and fork being of such length that when the pillow block is in folded position and the spindle is in folded position with the ground wheel above the block, the handle fits through said slot, and said bracing means being adapted to be moved into engagement with the shoulder of the fork so as to prevent outward movement of the spindle when folded.

In testimony whereof I affix my signature.

WILLIAM E. GLEESON.